Dec. 27, 1955  D. R. DE BOISBLANC ET AL  2,728,836
TEMPERATURE SENSING ELEMENT
Filed June 7, 1951

INVENTORS
D.R. DE BOISBLANC
R.S. MARSDEN, JR.
BY
Hudson & Young
ATTORNEYS

2,728,836

TEMPERATURE SENSING ELEMENT

Deslonde R. de Boisblanc and Ross S. Marsden, Jr., Bartlesville, Okla., assignors to Phillips Petroleum Company, a corporation of Delaware Application June 7, 1951, Serial No. 230,344

4 Claims. (Cl. 201—63)

This invention relates generally to temperature sensing elements and to methods for constructing same. In another aspect it relates to electrical apparatus for measuring high temperatures.

Recently it has become known that there exists within any electrical conductor a random statistical movement of electrical charges. This statistical distribution of electrical charges is referred to as "thermal noise" since minute voltage fluctuations measured across the end terminals of an electrically conducting element are directly proportional to the absolute temperature of said element. The relationship can be expressed mathematically by the Nyquist formula:

$$\overline{E^2} = 4kR_e(Z)T\Delta f \qquad (1)$$

where $\overline{E^2}$ equals the mean-square voltage fluctuations across the element, $\Delta f$ is the frequency band over which the voltage fluctuations are measured, $k$ is Boltzmann's gas constant, $R_e(Z)$ is the real part of the complex impedance of the element, and T is the absolute temperature of the element. Through the use of this relationship the temperature of a given first resistance element can be measured by comparing the voltage fluctuations generated across said resistance element with the voltage fluctuations generated across a second resistance element at a known reference temperature. Suitable apparatus for measuring temperature in accordance with this method is described and claimed in our copending application, Serial No. 220,115, filed April 9, 1951. In the circuitry of this copending application the real parts of the complex impedance of the two networks under comparison are equalized leaving the equation $$\frac{\overline{E_1^2}}{\overline{E_2^2}} = \frac{T_1}{T_2} \qquad (2)$$

which readily can be solved for the unknown temperature.

The above-mentioned thermal noise thermometer is particularly valuable for high temperature measurement in those regions wherein satisfactory primary standards for comparison do not exist. However, at these high temperatures considerable difficulty is encountered in constructing operable resistance elements. Ordinary metallic resistors which may be used effectively at low temperatures are decidedly limited at higher temperatures. Since the thermal noise generated is known to be directly proportional to resistance, it can be seen that low resistance elements produce very little measurable noise and therefore are not practical. Metallic resistors which are capable of withstanding high temperatures, for example: platinum, tungsten, or iridium, are relatively good electrical conductors, thereby requiring that the element have a very small cross section and a relatively great length in order to offer the desired ohmic resistance, it having been found that elements having a resistance of approximately 1,000 to 10,000 ohms give satisfactory results. It should also be noted that most metallic resistors are limited further by their tendency to oxidize, fuse, or emit electrons at high temperatures.

In accordance with the present invention, it has been discovered that glass can be used as the thermal noise generating element in the above-described thermal noise thermometer, thereby giving excellent results in those temperature regions in which the glass normally is molten. Sensing elements constructed of glass are much easier to fabricate than metals, and are cheaper to construct than metallic resistors capable of withstanding high temperatures. In addition to use in thermal noise thermometers these improved electrical resistance elements effectively can be employed as the temperature sensing element in various other forms of known resistance thermometers. Accordingly, this invention is directed toward providing improved temperature sensing elements for use in both thermal noise thermometers and in electrical resistance thermometers.

It is, therefore, an object of this invention to provide temperature sensing elements capable of withstanding high temperatures.

A further object is to provide improved methods for measuring temperature.

A still further object is to provide temperature sensing resistance elements which are rugged in construction, economical to manufacture, which possess desired electrical properties, and which operate in a satisfactory manner at high temperatures.

Various other objects, advantages, and features of this invention should become apparent from the following detailed description taken in conjunction with the accompanying drawings in which.

Figure 3:
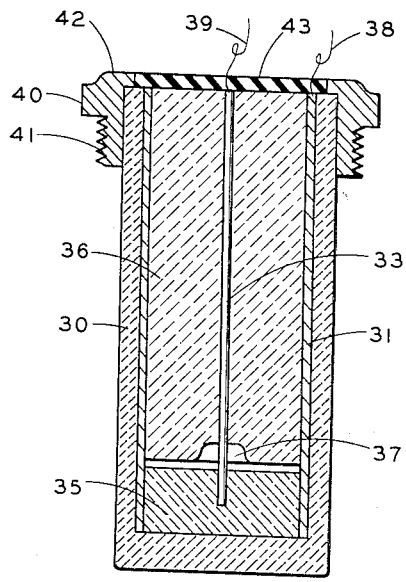
Figure 4:
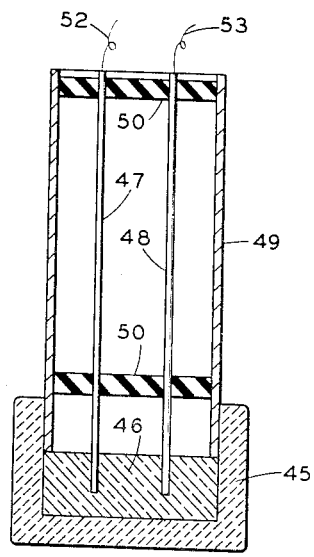
Figure 5:
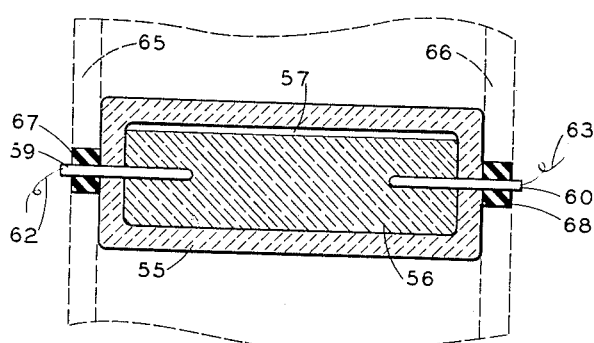
Figure 6:
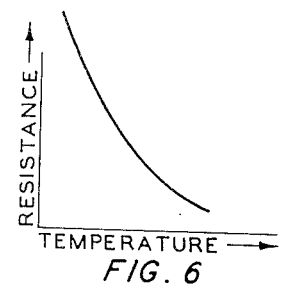

Figures 3, 4, and 5 illustrate various forms of temperature sensing elements constructed in accordance with this invention; and Figure 6 is a graphical representation of the electrical resistance of these elements at different temperatures.

Figure 1:
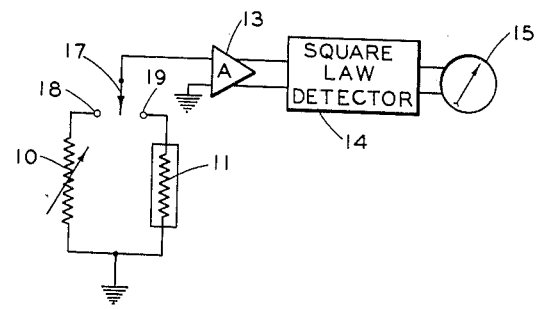
Figure 1 shows schematically an electrical circuit useful in measuring high temperatures.

Referring now to the drawing in detail and to Figure 1 in particular, there is shown a simplified version of the thermal noise thermometer circuit more fully described and claimed in our aforementioned application, Serial No. 220,115. A reference variable resistance element 10, and an unknown resistance element 11 constructed in accordance with the present invention, are connected alternately in circuit with amplifier 13, square law detector 14, and meter 15 by means of switch 17. Resistance element 10 is maintained at a known temperature while temperature sensing element 11 is positioned at the unknown temperature being measured. In operating this thermometer the impedances of the two elements first are equalized over a preselected frequency range by suitable means, not shown. This equalization can be accomplished by applying an alternating current voltage source of variable frequency across first one element and then across the other. The corresponding voltage drop across each element is measured on meter 15, and the resistance of element 10 is adjusted until the two impedances are equalized over the preselected frequency range. Thermal noise voltage fluctuations generated across each element are read on meter 15 which, due to the presence of square law detector 14, which can be a thermocouple, are proportional to the mean-square voltage fluctuation generated across each element. This ratio of mean-square readings is substituted in Equation 2 to obtain the unknown temperature.

Figure 2:
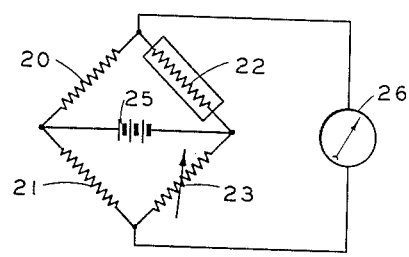
Figure 2 shows schematically a Wheatstone bridge-type resistance thermometer.

In Figure 2 there is illustrated a conventional Wheatstone bridge-type resistance thermometer having resistors 20, 21, 22, and 23 connected in bridge arrangement with voltage source 25 being applied across opposite corners of the bridge circuit. Meter 26, which can be a sensitive galvanometer, is applied across the second pair of opposite terminals of said bridge circuit. Resistance element 22, constructed in accordance with the present invention, is positioned at the unknown temperature being measured and the remaining resistors 20, 21, and 23 are maintained at a constant temperature. By adjusting resistor 23 until a balanced condition is obtained, that is, there being a null reading on meter 26, the resistance of element 22 can be computed from the well known bridge circuit equation $$\frac{R_{20}}{R_{21}} = \frac{R_{22}}{R_{23}}$$

where the various R's represent the resistance of the corresponding resistance elements having like subscripts. Knowing the resistance of element 22, its temperature can readily be obtained from a previously determined calibration curve of resistance versus temperature.

Various forms of temperature sensing resistance elements for use in the above-described thermometer circuits are illustrated in Figures 3, 4, and 5.

Referring now to Figure 3, there is shown a temperature sensing element comprising a cylindrically shaped hollow casing 30 constructed of a suitable refractory material, such as aluminum oxide, for example, which is capable of withstanding extremely high temperatures. Enclosed within casing 30 is a hollow cylindrical metallic electrode 31 into which is positioned a second metallic electrode 33. At the closed end of casing 30 there is inserted a small quantity of powdered glass 35 which becomes fused at the temperatures under consideration thereby making electrical contact between casing 31 and rod 33, both of which are inserted in said glass 35. Above the region of glass 35 and within casing 31 there is positioned a quantity of suitable refractory material 36, such as aluminum oxide, which completely encloses the interior of casing 31 with the exception of a small air pocket 37 provided above glass 35 to allow for thermal expansion. Attached to the upper end of casing 31 and electrode 33, respectively, are electrical leads 38 and 39 which serve to connect this temperature sensing element into either the circuit of Figure 1 or the circuit of Figure 2. A metallic support in the form of a nut-shaped cap 40 having a threaded flanged portion 41 is secured to the top of casing 30, thereby allowing sensing element to be held by threads 41 within a region, such as a combustion chamber, whose temperature is to be determined. It should be apparent that this described element is effective in any position since the quantity of fused glass 35 is completely enclosed within the element.

In Figure 4 there is illustrated a modified form of the sensing element of Figure 3. This arrangement provides a cylindrically shaped ceramic vessel 45 containing a quantity of glass 46. Two metallic electrodes 47 and 48 are mounted within and electrically insulated from the cylindrically shaped metallic casing 49 by means of suitable insulating supports such as 50. Electrical leads 52 and 53 are connected to electrodes 47 and 48, respectively. Metallic casing 49 which supports electrodes 47 and 48 is positioned with respect to vessel 45 so that the glass contained therein makes electrical contact with both of said electrodes 47 and 48.

Figure 5 shows a hollow refractory casing 55 containing a quantity of glass 56 which completely occupies the casing with the exception of a small air pocket 57. Spaced opposing metallic electrodes 59 and 60 having respective electrical leads 62 and 63 attached thereto are inserted through suitable openings in casing 55 to make electrical contact with glass 56. As illustrated, this temperature sensing element can be positioned in a region whose temperature is to be determined, such as for example, a furnace whose walls are shown as dotted segments 65 and 66. Insulating seals 67 and 68 surround electrodes 59 and 60, respectively, and secure the temperature sensing element to walls 65 and 66.

The temperature sensing elements illustrated in Figures 3, 4, and 5 represent present preferred embodiments of this invention. However, satisfactory results can be obtained with various other modifications. For example, the various electrodes 31, 33, 47, 48, 59 and 60 can be formed of a conducting refractory material in place of metal. Suitable materials for this purpose include silicon carbide, titanium carbide, zirconium carbide, columbium carbide, tantalum carbide, and tungsten carbide. The refractory containing vessels 30, 45, and 55 are desirable since they are capable of withstanding much higher temperatures than those required to fuse glass, and also since these refractory materials employed have considerably high electrical resistance than those materials mentioned above for use as electrodes. Any of several materials such as magnesium oxide, calcium oxide, zirconium oxide, beryllium oxide, and thorium oxide, for example, can be used in place of aluminum oxide. However, a vessel constructed of any material capable of withstanding the temperatures under measurement can be used in place of these refractory materials.

While glass normally is considered to be electrically non-conductive, at elevated temperatures, that is, at sufficiently high temperatures to fuse glass, the electrical conductivity is greatly increased with the glass exhibiting a negative coefficient of thermal resistivity. This is illustrated in Figure 6 which shows the relationship of the resistance to temperature of a given quantity of glass at various temperatures. As can be seen the resistance of this glass decreases rapidly with increasing temperatures. In selecting a particular type of glass for a given temperature measurement, consideration should be given to the temperature ranges encountered. For example, borosilicate glass has a softening point at approximately 698° C. while fused silica glass softens at approximately 1427° C. These two examples illustrate the fact that various types of glass fuse at different temperatures; the so-called "soft" glasses generally soften at lower temperatures than the "hard" glasses. Thus, for a particular temperature measurement, a glass which remains molten in the temperature range under consideration should be selected. The elements described in Figures 3, 4, and 5 can be constructed by powdering the particular glass selected and inserting this powdered glass within the appropriate casing. At the elevated temperatures under measurement the powdered glass will become fused, thereby making electrical contact between the two electrodes inserted therein.

It should be apparent that there has been provided in accordance with this invention temperature sensing resistance elements having molten glass as the resistance element. These elements are particularly adapted to the measurement of high temperatures. While the invention has been described in connection with present preferred embodiments thereof, it should be apparent to those skilled in the art that various modifications as to size, shape, materials used, and arrangement of parts can be resorted to without departing from the scope of this invention.

Having described our invention, we claim:

1. A temperature sensing element comprising, in combination, a hollow cylindrically-shaped vessel of refractory material closed at one end, a quantity of glass positioned within said vessel, said glass becoming molten at elevated temperatures, a threaded cap fixed to the open end of said vessel, a hollow cylindrically-shaped first electrode positioned within said vessel and making electrical contact with said glass, and a rod-shaped second electrode positioned axially within said first electrode and electrically insulated therefrom by a cylindrical plug of ceramic material positioned between said first and said second electrodes, said rod passing axially through said plug.

2. A temperature sensing element comprising, in combination, a hollow cylindrically-shaped vessel of aluminum oxide closed at one end, a quantity of glass positioned within said vessel, said glass becoming molten at elevated temperatures, a threaded cap fixed to the open end of said vessel, a hollow cylindrically-shaped first metallic electrode positioned within said vessel and making electrical contact with said glass, and a rod-shaped second metallic electrode positioned axially within said first electrode and electrically insulated therefrom by a cylindrical plug of ceramic material positioned between said first and said second electrodes, said rod passing axially through said plug.

3. A temperature sensing element comprising, in combination, a hollow cylindrically-shaped vessel of aluminum oxide closed at one end, a quantity of glass positioned within said vessel, said glass becoming molten at elevated temperatures, a threaded cap fixed to the open end of said vessel, a hollow cylindrically-shaped first silicon carbide electrode positioned within said vessel and making electrical contact with said glass, and a rod-shaped second silicon carbide electrode positioned axially within said first electrode and electrically insulated therefrom by a cylindrical plug of ceramic material positioned between said first and said second electrodes, said rod passing axially through said plug.

4. A temperature sensing element comprising a vessel of refractory material closed at one end, a quantity of glass positioned within said vessel, said glass becoming molten at elevated temperatures, a cap fixed to the open end of said vessel, a hollow first electrode positioned within said vessel and making electrical contact with said glass, and a second electrode positioned within said first electrode and insulated therefrom by a plug of ceramic material positioned between said first and second electrodes, said second electrode passing through said plug into contact with said glass.

References Cited in the file of this patent

UNITED STATES PATENTS

| | | |
|---|---|---|
| 859,890 | Read | July 9, 1907 |
| 1,144,776 | Northrup | June 29, 1915 |
| 1,858,265 | Dahlstrom | May 17, 1932 |
| 2,102,955 | Hulme | Dec. 21, 1937 |
| 2,106,249 | Hower | Jan. 25, 1938 |
| 2,316,872 | Kernen | Apr. 20, 1943 |

FOREIGN PATENTS

| | | |
|---|---|---|
| 232,676 | Germany | Mar. 20, 1911 |
| 644,931 | Germany | May 18, 1937 |
| 888,007 | France | Aug. 30, 1943 |

OTHER REFERENCES

Garrison et al.: Review of Scientific Instruments, vol. 20, No. 11, November 1949, pp. 785–794.